US006899400B1

(12) United States Patent
Cook

(10) Patent No.: US 6,899,400 B1
(45) Date of Patent: May 31, 2005

(54) MOTORCYCLE WHEEL

(75) Inventor: Roy P. Cook, Temecula, CA (US)

(73) Assignee: Banner American Products, Inc., Temecula, CA (US)

( * ) Notice: Subject to any disclaimer, the term of this patent is extended or adjusted under 35 U.S.C. 154(b) by 0 days.

(21) Appl. No.: 10/634,270

(22) Filed: Aug. 5, 2003

(51) Int. Cl.[7] ............................................. B60B 7/20
(52) U.S. Cl. ............................ 301/37.25; 301/37.41; 301/64.201
(58) Field of Search ......................... 301/37.25, 37.41, 301/64.201, 64.202, 64.203, 64.301, 64.302, 301/64.303, 64.704, 64.706, 65; 280/217; 310/67 A

(56) References Cited

U.S. PATENT DOCUMENTS

| | | | | |
|---|---|---|---|---|
| 639,567 A | * | 12/1899 | Henderson | 280/217 |
| 884,702 A | * | 4/1908 | Bowden | 301/73 |
| 1,568,672 A | * | 1/1926 | Kellogg | 301/64.201 |
| 1,599,117 A | * | 9/1926 | Conlon | 280/217 |
| 3,695,728 A | * | 10/1972 | Haussels | 301/64.706 |
| 3,787,066 A | * | 1/1974 | Hautier | 280/217 |
| 4,201,011 A | * | 5/1980 | Cook | 446/440 |
| 5,104,199 A | * | 4/1992 | Schlanger | 301/64.704 |
| 6,486,582 B1 | * | 11/2002 | Patarchi | 310/166 |

FOREIGN PATENT DOCUMENTS

FR 2592354 * 12/1985

* cited by examiner

Primary Examiner—Russell D. Stormer
(74) Attorney, Agent, or Firm—Loyal McKinley Hanson

(57) ABSTRACT

A wheel for a motorcycle, bicycle, or other wheeled vehicle includes first and second wheel sections that are bolted or otherwise assembled together over an independently rotatable spinner component. Each wheel section has a hub portion, a rim portion, and a spoke portion such that the two hub portions form a combined hub portion of the motorcycle wheel, the two rim portions form a combined rim portion of the motorcycle wheel, and the two spoke portions form a combined spoke portion of the motorcycle wheel. The two spoke portions define an interior space between them. The spinner component is mounted rotatably on the combined hub portion of the wheel assembly in the interior space between the first and second spoke portions for freewheel rotation about the rotational axis independent of the rest of the wheel.

13 Claims, 3 Drawing Sheets

MOTORCYCLE WHEEL

BACKGROUND OF THE INVENTION

1. Technical Field

This invention relates generally to motorcycles, and more particularly to a wheel for a motorcycle, bicycle, or other wheeled vehicle with interest-arousing decorative features.

2. Description of Related Art

A typical motorcycle wheel includes a hub, a tire-supporting rim, and a rim-supporting set of spokes. The hub is centered on a rotational axis, the rim is disposed symmetrically about the rotational axis as a tire-supporting structure, and the spokes connect the rim to the hub as a rim-supporting structure. Once a tire is mounted on the rim, the hub mounts on the fork of the motorcycle.

As reflected by the motorcycle wheels currently available, motorcyclists take great pride in their machines. Motorcycle wheels are fabricated from different materials in decorative ways that enhance motorcycle appearance. However, there is always interest in new, decorative wheel arrangements and so a need exists for a new motorcycle wheel with interest-arousing, decorative, and/or novel features.

SUMMARY OF THE INVENTION

This invention addresses the need outlined above by providing a wheel for a motorcycle, bicycle, or other wheeled vehicle that includes first and second wheel sections assembled together over an independently rotatable spinner component. The spinner component is mounted on the hub of the motorcycle wheel in a visible position in between the spokes with a bearing such that bearing friction causes the spinner to rotate when the motorcycle is in motion. The spinner continues to rotate (i.e., freewheels) as an eye-catching, decorative novelty item when the wheel stops until bearing friction causes it to slowly coast to a stop.

To paraphrase some of the more precise language appearing in the claims and further introduce the nomenclature used, a wheel constructed according to the invention includes first and second wheel sections that are bolted or otherwise suitably assemble together. The first wheel section has a first hub portion, a first rim portion, and a first spoke portion connecting the first hub portion and the first rim portion. The second wheel section has a second hub portion that combines with the first hub portion to form a combined hub portion of the wheel that is centered on a rotational axis, a second rim portion that combines with the first rim portion to form a combined rim portion of the wheel (i.e., a tire-supporting portion) that is disposed symmetrically about the rotational axis, and a second spoke portion connecting the second hub portion to the second rim portion that combines with the first spoke portion to define an interior space between the first and second spoke portions. In that regard, the term "spoke" herein includes any radially extending bar, finger, arm or other rim-supporting structure connected between the rim and the hub to support the rim such that a person adjacent the wheel can see into at least a portion of the interior space.

According to the major aspect of the invention, the wheel includes a spinner component that is mounted rotatably on the combined hub portion in the interior space between the first and second spoke portions for rotation about the rotational axis independent of the combined hub, the combined rim, and the combined spoke portions of the motorcycle wheel. One embodiment includes a ball bearing component mounted on the combined hub portion of the wheel assembly as means for rotatably mounting the spinner component on the combined hub portion so that the spinner can freewheel relative to the rest of the wheel. Preferably, the spinner component includes a spinner hub in the form of an annular ring and a plurality of radially extending projections on the spinner hub.

Thus, the invention provides a wheel having a new, decorative, freewheeling spinner component for motorcyclists to include on their machines. The following illustrative drawings and detailed description make the foregoing and other objects, features, and advantages of the invention more apparent.

DESCRIPTION OF THE PREFERRED EMBODIMENTS

Figure 1:
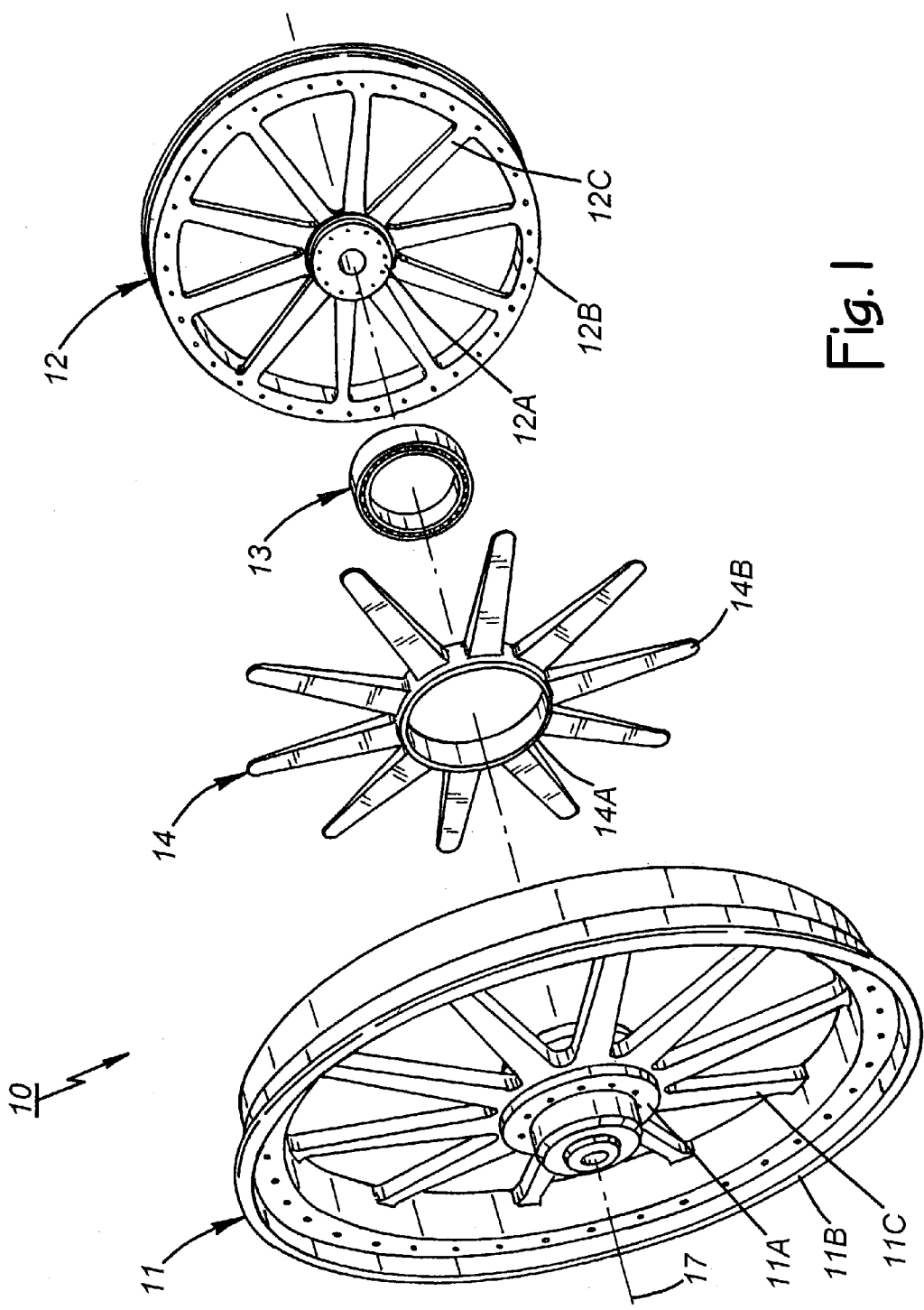
FIG. 1 of the drawings is an exploded perspective view of a motorcycle wheel constructed according to the invention showing the first and second wheel sections, the spinner component, and the ball bearing component aligned along a rotational axis.
Figure 2:
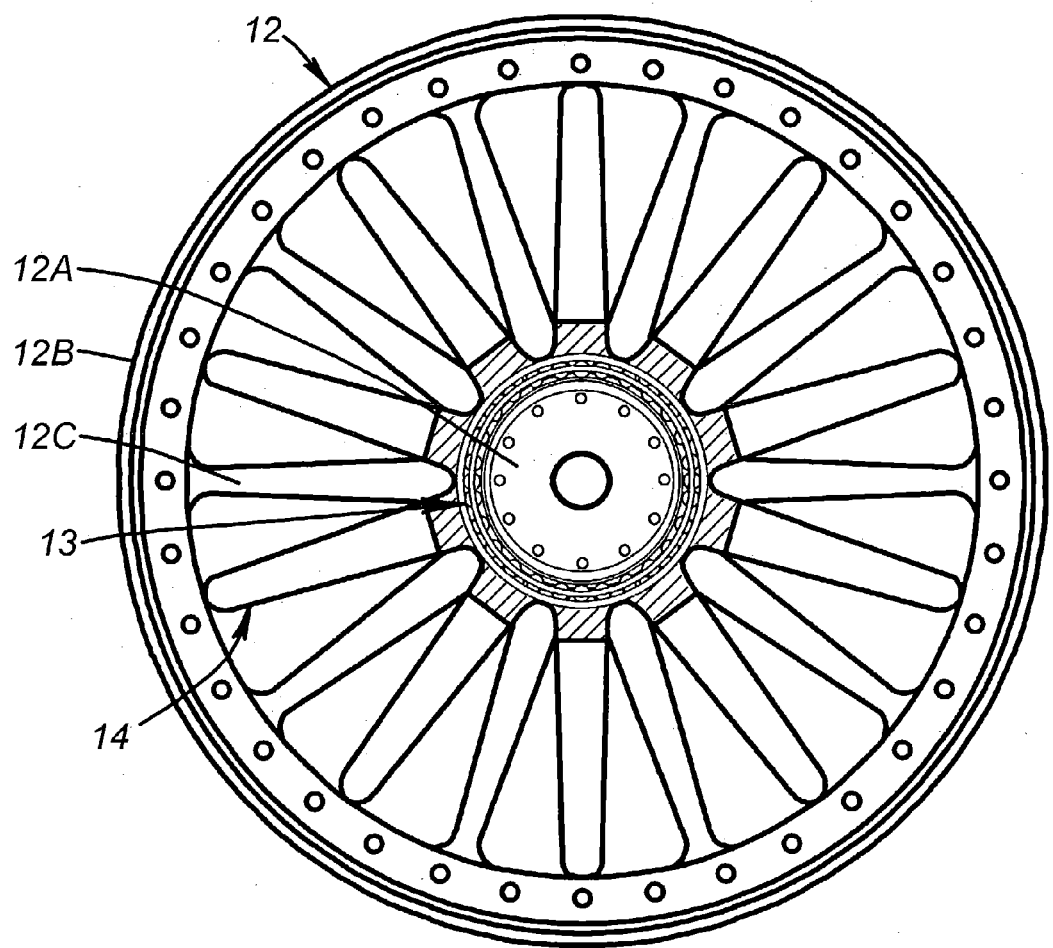
FIG. 2 is a side elevation view of just the first wheel section assembled with the spinner component and the ball bearing component before addition of the second wheel section.
Figure 3:
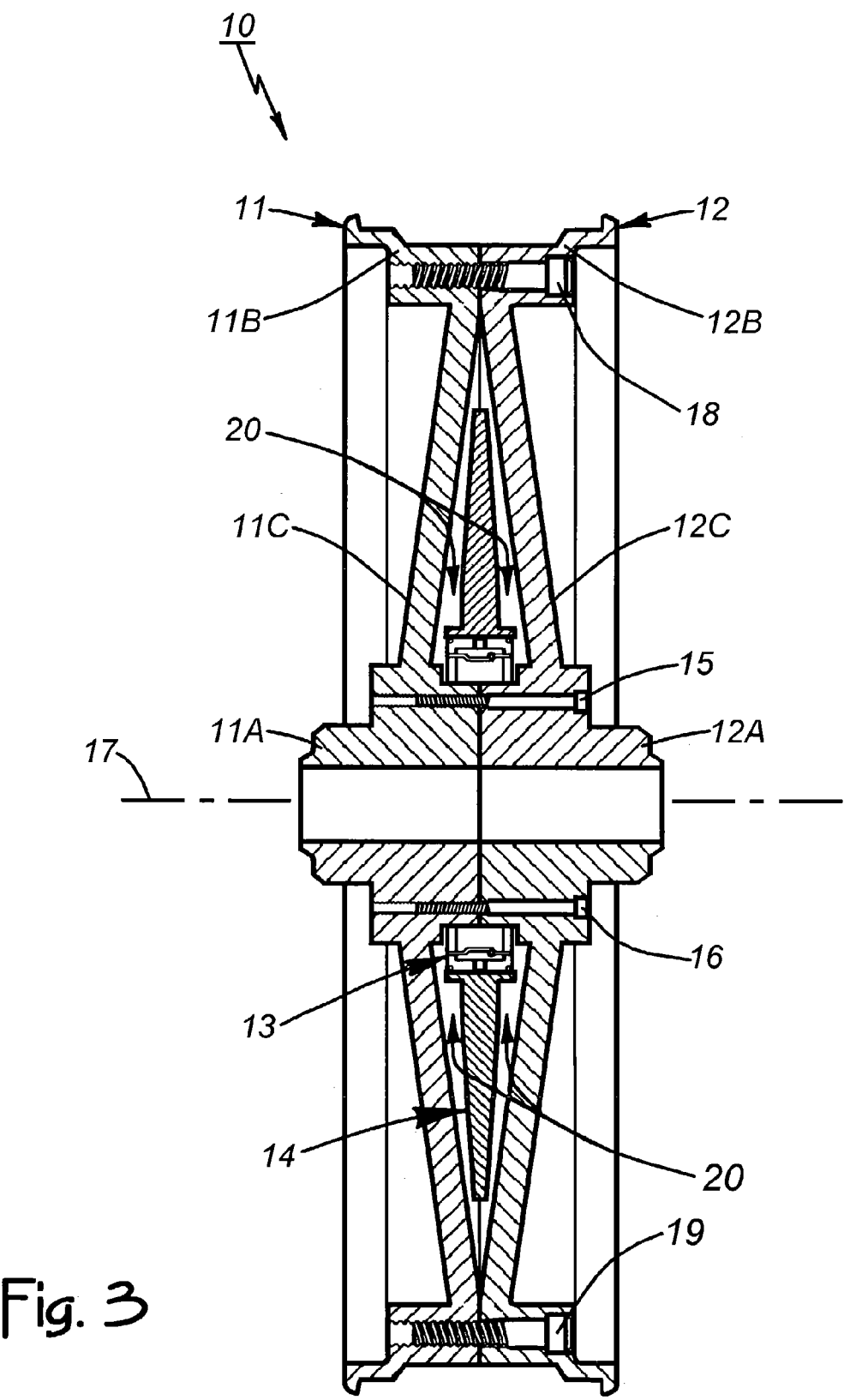
FIG. 3 is a cross sectional front elevation view of the assembled motorcycle wheel as viewed in a vertical plane containing the rotational axis.

FIGS. 1–3 of the drawings show various aspects of a motorcycle wheel 10 constructed according to the invention. Generally, the motorcycle wheel 10 includes first and second wheel sections 11 and 12 that are assembled together with a ball bearing component 13 over a spinner component 14. Those components may be aluminum or other suitable material, and that arrangement enables the spinner component 14 to freewheel relative to the rest of the motorcycle wheel 10 for the interesting and decorative effect resulting. It spins on the ball bearing component 13.

More specifically, the first wheel section 11 includes a first hub portion 11A, a first rim portion 11B, and a first spoke portion 11C that is connected between the first hub portion 11A and the first rim portion 11B as a first rim-supporting structure. Similarly, the second wheel section 12 includes a second hub portion 12A, a second rim portion 12B, and a second spoke portion 12C that is connected between the second hub portion 12A and the second rim portion 12B as a second rim-supporting structure.

The second hub portion 12A of the second wheel section 12 is connected to the first hub portion 11A of the first wheel section 11 with hub-securing bolts (e.g., machine screws), just two hub-securing bolts 15 and 16 being identified in FIG. 3 for illustrative reasons. So connected, the first and second hub portions 11A and 12A form a combined hub portion of the motorcycle wheel 10 (i.e., the combination of the first and second hub portions 11A and 12A) that is centered on a rotational axis 17 (FIG. 3) and suitable for mounting on a motorcycle.

In addition, the second rim portion 12B of the second wheel section 12 is connected to the first rim portion 11B of the first wheel section 11 with rim-securing bolts (e.g., machine screws). Just two rim-securing bolts 18 and 19 are identified in FIG. 3. So connected, the first and second rim portions 11B and 12B form a combined rim portion of the motorcycle wheel 10 (i.e., the combination of the first and second rim portions 11B and 12B) that is disposed symmetrically about the rotational axis 17 as a tire-supporting structure suitable for supporting a motorcycle tire.

Preferably, the first and second wheel sections 11 and 12 are arranged so that the hub-securing bolts and the rim-securing bolts alternate in the direction in which they are screwed in for improved balance. In other words, every other bolt around the combined hub portion extends through the first hub portion 11A and screws into threaded engagement of the second hub portion 12A, while the intermediate bolts extend through the second hub portion 12A and screw into threaded engagement of the first hub portion 11A. Similarly, every other bolt around the combined rim portion extends through the first rim portion 11B and screws into threaded engagement of the second rim portion 12B, while the intermediate bolts extend through the second rim portion 12B and screw into threaded engagement of the first rim portion 11B.

With the first and second wheel sections 11 and 12 assembled together that way, the second spoke portion 12C combines with the first spoke portion 11C to define an interior space 20 between the first and second spoke portions (FIG. 3). In other words, the first and second spoke portions 11C and 12C are so shaped and dimensioned that they define the space 20 when the first and second wheel sections 11 and 12 are assembled together. The interior space 20 may be described as an annular space circumscribing the combined hub portion of the motorcycle wheel 10 (i.e., the combination of the first and second hub portions 11A and 12A). The spinner component 14 is mounted rotatably on the combined hub portion in the interior space 20 between the first and second spoke portions 11C and 12C by means of the ball bearing component 13 for rotation about the rotational axis 17 independent of the rest of the motorcycle wheel 10.

Based upon the foregoing and subsequent descriptions, one of ordinary skill in the art can readily practice the invention and utilized it for motorcycles, bicycles, and other wheeled vehicles. Preferably, the first and second wheel sections 11 and 12 are identical components in order to promote balance and ease of manufacturing and assembly and to reduced cost. They are positioned in the assembled motorcycle wheel 10 as what may be described as mirror images of each other relative to a bisecting plane perpendicular to the rotational axis 17. They are sized according to the tire size of the tire to be mounted on the combined rim portion (the combination of rim portions 11B and 12B).

The ball bearing component 13 is a known type of bearing in which the journal turns upon loose hardened steel balls that roll easily in a race. It mounts on the combined hub portion of the motorcycle wheel 10 where it functions as means for rotatably mounting the spinner component 14 on the combined hub portion. (the combination of rim portions 11B and 12B).

The combined hub portion is arranged for mounting rotatably on a motorcycle or other wheeled vehicle (e.g., with a through bore centered on the rotational axis 17 that receives a motorcycle axle component). The term "spoke" herein includes any radially extending bar, finger, arm or other rim-supporting structure connected between the first and second hub portions 11A and 12A and the first and second rim portions 11A and 12A to support the rim portions such that a person adjacent the motorcycle wheel 10 can see into at least a portion of the interior space 20.

Concerning the phrase "rotation about the rotational axis independent of the wheel assembly," that phrase means that the spinner component 14 is free to rotate about the rotational axis 17 at a different rotational speed than the combined hub portion of the assembled motorcycle wheel 10 (i.e., the combination of 11A & 12A). It freewheels relative to the combined hub portion. The illustrated spinner component 14 includes a hub 14A that mounts on the ball bearing component 13, and a plurality of ten, circumferentially spaced apart, radially extending dummy spokes or fingers 14B (FIG. 1) that extend radially outwardly from the hub 14A. However, any of other various forms of spinner component may be used that is arranged to freewheel (i.e., spin) on the combined hub portion within the interior space 20. Just one finger 14B is identified in FIG. 1 for illustrative convenience.

Thus, the invention provides an eye-catching, decorative motorcycle wheel that includes two wheel sections assembled over a freewheeling spinner component. Although an exemplary embodiment in the form of a motorcycle wheel has been shown and described, one of ordinary skill in the art may make many changes, modifications, and substitutions without necessarily departing from the spirit and scope of the invention, including applying the invention to a wheel for a bicycle or other wheeled vehicle such that the wheel has a hub, a tire-supporting rim, and a rim-supporting set of spokes.

What is claimed is:

1. A wheel, comprising:
   a first wheel section having a first hub portion, a first rim portion, and a first spoke portion connecting the first hub portion and the first rim portion;
   a second wheel section connected to the first wheel section, the second wheel section having a second hub portion that combines with the first hub portion to form a combined hub portion of the wheel that is centered on a rotational axis, a second rim portion that combines with the first rim portion to form a combined rim portion of the wheel that is disposed symmetrically about the rotational axis, and a second spoke portion connecting the second hub portion and the second rim portion that combines with the first spoke portion to define an interior space between the first and second spoke portions; and
   a spinner component mounted rotatably on the combined hub portion in the interior space between the first and second spoke portions for rotation about the rotational axis independent of the combined hub portion;
   wherein the spinner component is not driven by a pulley component.

2. A wheel as recited in claim 1, further comprising a bearing component mounted on the combined hub portion that functions as means for rotatably mounting the spinner component on the combined hub portion.

3. A wheel as recited in claim 2, wherein the bearing component is a ball bearing assembly.

4. A wheel as recited in claim 1, wherein the spinner component includes a hub in the form of an annular ring and a plurality of radially extending projections on the hub.

5. A wheel as recited in claim 1, wherein the first and second wheel sections are bolted together.

6. A wheel as recited in claim 1, wherein the first and second rim portions are bolted together.

7. A wheel as recited in claim 1, wherein the first and second hub portions are bolted together.

8. A wheel, comprising:
   a first wheel section having a first hub portion, a first rim portion, and a first spoke portion connecting the first hub portion and the first rim portion;
   a second wheel section connected to the first wheel section, the second wheel section having a second hub portion that combines with the first hub portion to form a combined hub portion of the wheel that is centered on a rotational axis, a second rim portion that combines with the first rim portion to form a combined rim portion of the wheel that is disposed symmetrically about the rotational axis, and a second spoke portion connecting the second hub portion and the second rim portion that combines with the first spoke portion to define an interior space between the first and second spoke portions;

a bearing component; and a spinner component mounted rotatably with the bearing component on the combined hub portion in the interior space between the first and second spoke portions for freewheeling rotation about the rotational axis independent of the combined hub portion;

wherein the spinner component is driven by friction of the bearing component without being driven by a pulley component.

9. A wheel as recited in claim 8, wherein the bearing component is a ball bearing assembly.

10. A wheel as recited in claim 8, wherein the spinner component includes a hub in the form of an annular ring and a plurality of radially extending projections on the hub.

11. A wheel as recited in claim 8, wherein the first and second wheel sections are bolted together.

12. A wheel as recited in claim 8, wherein the first and second rim portions are bolted together.

13. A wheel as recited in claim 8, wherein the first and second hub portions are bolted together.

* * * * *